(12) United States Patent
Hettervik et al.

(10) Patent No.: US 9,948,645 B2
(45) Date of Patent: *Apr. 17, 2018

(54) TECHNIQUES FOR CALL-BASED USER VERIFICATION

(71) Applicant: Facebook, Inc., Menlo Park, CA (US)

(72) Inventors: Bradley Edward Hettervik, Sunnyvale, CA (US); Surendra Gadodia, Fremont, CA (US); Xiao Liang, Mountain View, CA (US); Antony T. Fu, Cupertino, CA (US); Molly Jane Fowler, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,137

(22) Filed: Sep. 12, 2016

(65) Prior Publication Data

US 2016/0381018 A1 Dec. 29, 2016

Related U.S. Application Data

(63) Continuation of application No. 14/530,190, filed on Oct. 31, 2014, now Pat. No. 9,461,998.

(51) Int. Cl.
*G06F 7/04* (2006.01)
*H04L 29/06* (2006.01)
*G06F 21/44* (2013.01)
*G06F 21/43* (2013.01)
*G06F 17/30* (2006.01)

(52) U.S. Cl.
CPC .......... *H04L 63/0884* (2013.01); *G06F 21/43* (2013.01); *G06F 21/44* (2013.01); *H04L 63/123* (2013.01); *H04L 67/42* (2013.01); *G06F 17/30312* (2013.01)

(58) Field of Classification Search
CPC .... H04L 63/0884; H04L 63/123; G06F 21/44
USPC .......................................................... 726/7
See application file for complete search history.

(56) References Cited

U.S. PATENT DOCUMENTS

| 2006/0021004 | A1* | 1/2006 | Moran | H04L 63/08 726/2 |
| 2013/0018793 | A1* | 1/2013 | Wong | G06Q 20/4097 705/44 |
| 2014/0137225 | A1* | 5/2014 | Chickering | G06F 21/00 726/8 |

* cited by examiner

*Primary Examiner* — Mohammad W Reza

(57) ABSTRACT

Techniques for call-based user verification are described. In one embodiment, for example, an apparatus may comprise a processor circuit and a storage component. The apparatus may further comprise a session component, an identification (ID) component, a mapping component, and a verification component. The session component may be operative on the processor circuit and configured to receive session data from a client device and store the session data in the storage component. The ID component may be operative on the processor circuit and configured to request ID data from a server, receive ID data from the server, and send the ID data to the client device. The mapping component may be operative on the processor circuit and configured to map the session data with the ID data. The verification component may be operative on the processor circuit and configured to receive a confirmation from the client device, request verification from the server, and upon receiving verification from the server, verify the client device. Other embodiments are described and claimed.

20 Claims, 10 Drawing Sheets

TECHNIQUES FOR CALL-BASED USER VERIFICATION

CROSS-REFERENCE TO RELATED APPLICATION

This application is a continuation under the provisions of 35 U.S.C. § 120 of U.S. patent application Ser. No. 14/530,190 filed Oct. 31, 2014. The disclosure of U.S. patent application Ser. No. 14/530,190 is hereby incorporated herein by reference in its entirety for all purposes.

BACKGROUND

The sign-up process for online services may require verification of a user or device based upon information, such as a phone number or email address. Such verification may be used to prevent unwanted spam, fraud, or other abuses of an online service. Verification of users may be difficult using mobile devices, which may have limited, or expensive, connectivity to servers required to perform verification. Further, some mobile devices may have limited user interfaces, making it difficult for users to enter the information required to perform verification. For these reasons, especially in some developing areas of the world where connectivity and mobile devices are less advanced, the step of verification sometimes dissuades users from completing a sign up process for an online service, which is disadvantageous for the user and for the online service. Thus, a need exists for a streamlined verification process that users of mobile devices may use to perform verification during the sign up process for an online service.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are direct to techniques for call-based user verification. In one embodiment, for example, an apparatus may comprise a processor circuit and a storage component. The apparatus may further comprise a session component, an identification (ID) component, a mapping component, and a verification component. The session component may be operative on the processor circuit and configured to receive session data from a client device and store the session data in the storage component. The ID component may be operative on the processor circuit and configured to request ID data from a server, receive ID data from the server, and send the ID data to the client device. The mapping component may be operative on the processor circuit and configured to map the session data with the ID data. The verification component may be operative on the processor circuit and configured to receive a confirmation from the client device, request verification from the server, and upon receiving verification from the server, verify the client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
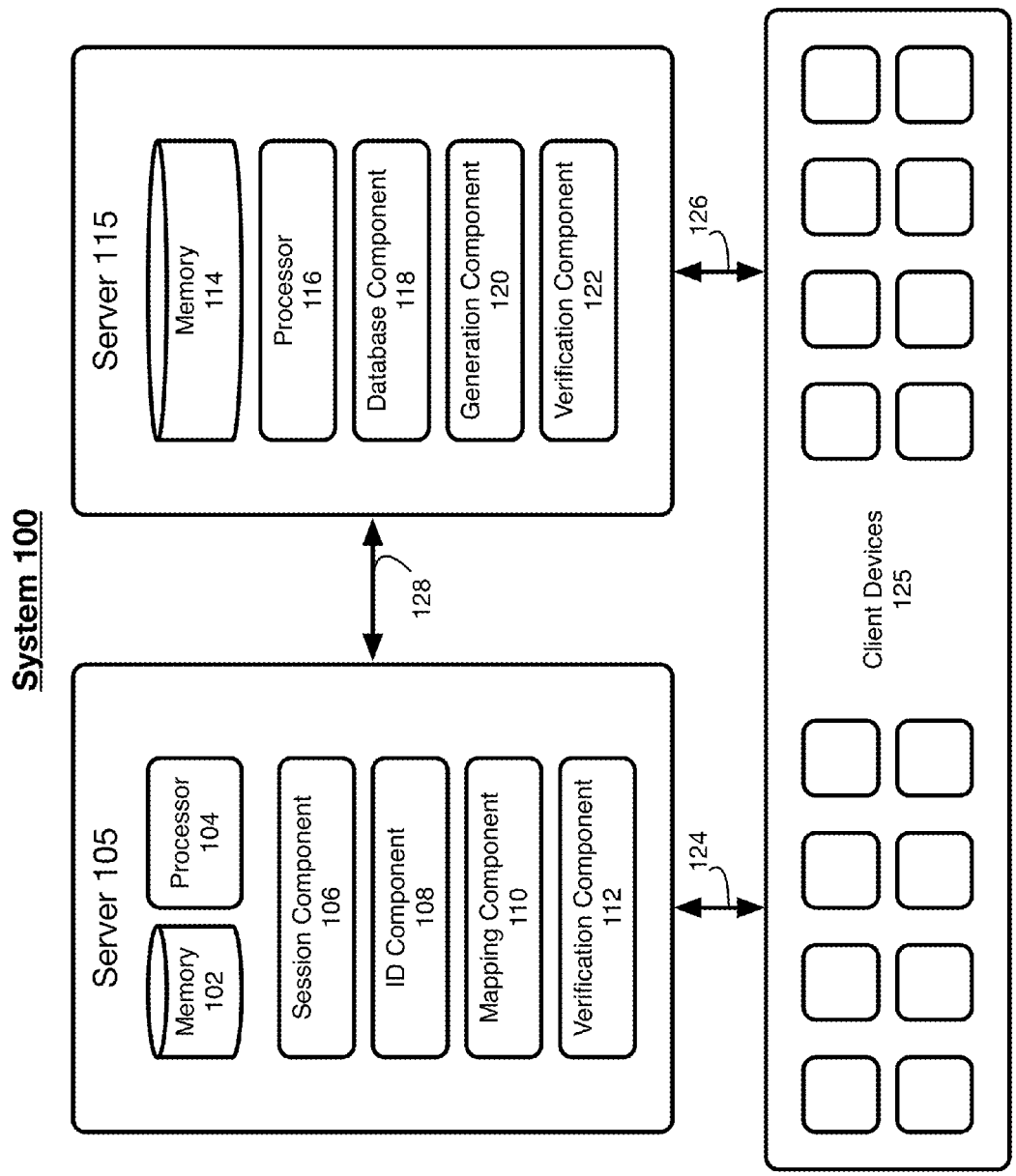
FIG. 1 illustrates an embodiment of a system.

Various embodiments are direct to techniques for call-based user verification. In one embodiment, for example, an apparatus may comprise a processor circuit and a storage component. The apparatus may further comprise a session component, an identification (ID) component, a mapping component, and a verification component. The session component may be operative on the processor circuit and configured to receive session data from a client device and store the session data in the storage component. The ID component may be operative on the processor circuit and configured to request ID data from a server, receive ID data from the server, and send the ID data to the client device. The mapping component may be operative on the processor circuit and configured to map the session data with the ID data. The verification component may be operative on the processor circuit and configured to receive a confirmation from the client device, request verification from the server, and upon receiving verification from the server, verify the client device. Other embodiments are described and claimed.

In some embodiments, ID data may include a direct inward dial (DID) telephone number that may be used by the client device to communicate with a server. When the DID telephone number is contacted by the client device within a defined time period, a server associated with the DID telephone number may verify that the client device has made such contact to another server. In various embodiments, other verification techniques may be made to provide further security. For example, verification from the server may be received after an originating telephone number associated with the client device is received in a communication and further matched with a carrier associated with the communication between the client device and the server. In this manner, spoofing, or faking, communications may be prevented and unwanted fraud may be avoided by an online service.

Since DID telephone numbers may be finite for a particular region, reusing DID telephone numbers may be desirable. To achieve reusability of DID telephone numbers, ID data, including a DID telephone number, may expire after a defined time period, and may be reused with a new client device after expiration of the defined time period. In some embodiments, information about network connectivity, whether cellular or data, may be used to dynamically adjust the defined time period for a client device to utilize ID data. For example, when it is determined that voice or data connectivity is slow or intermittent, a defined time period may be increased to give the client device ample opportunity to utilize ID data. When voice or data connectivity is determined to be working properly, a defined time period may be decreased, which may provide the opportunity to reuse ID data more quickly.

Connectivity charges, such as voice call, data, or messaging charges, may be important to users of client devices, such as mobile phones. For example, connectivity charges in developing countries may be significant to users and may deter users from providing information necessary to perform verification during the sign up process for an online service. Accordingly, in some embodiments, a communication from a client device using ID data may be disconnected by a server prior to the communication incurring a communication charge, such as a voice call, data, or messaging charge from a mobile carrier. For example, a telephone call may not incur a charge unless the connection has been established for a certain period of time, or unless a connection has successfully been made. Thus, a server contacted using ID data may determine that a connection attempt has been made without completing the connection, which may avoid fees being incurred.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise one or more components. Although the system 100 shown in FIG. 1 has a limited number of elements in a certain topology, it may be appreciated that the system 100 may include more or less elements in alternate topologies as desired for a given implementation. The system 100 may include a plurality of client devices 125, which may be generally operative to interact with servers 105 and 115 over network interfaces 124 and 126, respectively. Each of client devices 125 may include one or more processing units, storage units, network interfaces, or other hardware and software elements described in more detail below. Server 105 may be generally operative to interact with server 115 over network interface 128. Examples of network interfaces that may be used by client devices 125, server 105, and server 115 are set forth in more detail herein.

In an embodiment, each of client devices 125 may comprise without limitation a client device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, or a wearable computing device such as a smart watch. Server devices 105 and 115 may comprise without limitation a server, a server array or server farm, a web server, a network server, an Internet server, a work station, a mini-computer, a mainframe computer, a supercomputer, a network appliance, a web appliance, multiprocessor systems, processor-based systems, or any combination thereof.

In various embodiments, client devices 125, server device 105, and server device 115 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, client devices 125, server 105, and server 115 of the system 100 may be organized as a distributed system. A distributed system typically comprises multiple autonomous computers that communicate through a computer network. The computers may interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. While server 105 and server 115 are depicted as separate devices, it can be appreciated that the components of each device may be combined into a single server device in some embodiments. The embodiments are not limited in this context.

Each client device 125 may include a memory and processor, and may include one or more storage and processing components in some cases. In an embodiment, each client device 125 may include one or more applications, which may include, but are not limited to, native mobile applications, web applications, desktop software applications, or any combination thereof. Examples of applications may include social networking applications, newsreader applications, photography applications, video applications, media applications, search applications, games, e-reading applications, or the like. Applications may include sign up processes that require verification and may communicate over network interfaces 124 and 126 with server 105 and server 115 to perform verification according to one or more techniques described herein.

Server 105 may include memory component 102 and processor component 104, which each may comprise one more of the memory component and processor components described herein. In some embodiments, server 105 may include session component 106, which may be stored on memory component 102 and operative on processor component 104 to perform session operations. In an example, session component 106 may be configured to receive session data from one or more of client devices 125. Received session data may be stored by session component 106 in memory 102. Received session data may be stored in association with a user or client device 125 in a database. Session data may include, but is not limited to, data from server or client side web sessions implemented using one or more known communication session protocols. In some examples, a session cookie, such as an HTTP cookie, web cookie, or browser cookie may be stored on a client device and may be used to store session data, such as a session ID, user preferences, timing information, or security information. Session data stored within a cookie of a client device 125 may be shared with session component 106 via network interface 124, for example.

Storing and exchanging session data between one or more of client devices 125 and session component 106 may be used to maintain session continuity during the sign up process for an application or service. For example, verification of a user or client device may be required during the sign up process. The use of session data, such as a unique session ID stored in a session cookie, may be used to continue a session between a client device 125 and server 105 after a verification process is performed between a client device 125 and server 115, as described in detail below.

In some embodiments, server 105 may include identification (ID) component 108, which may be stored on memory component 102 and operative on processor component 104 to perform identification operations. Identification operations may include requesting ID data from a server, receiving ID data from the server, and sending the ID data to a client device. In an example, ID component 108 may be configured to request ID data from server 115 via network interface 128. Such a request may be made using an application programming interface (API) call between server 105 and server 115, for example. In response, generation component 120 of server 115 may generate ID data from database component 118, as discussed below, and return ID data to server 105. ID component 108 may then map the received ID data with a client device 125, and send the ID data to the client device 125. In some embodiments, ID data may include a DID telephone number, which may be mapped and shared with a client device 125. In this manner, a client device 125 may utilize received ID data to contact server 115 via network interface 126. Of course, it can be appreciated that ID data may include data other than a DID telephone number, such as an IP address, unique identifier, or other data that may be used to identify a client device 125 when contacting server 115.

In various embodiments, server 105 may include mapping component 110, which may be stored on memory component 102 and operative on processor component 104 to perform mapping operations. Mapping operations may include the association of session data with ID data, which may be associated in a database or other data structure stored in memory 102, or other memory component of server 105. During mapping, mapping component 110 may associate a client device 125 with session data and ID data. In this manner, verification, as discussed below, may be made as to whether a particular client device 125 has utilized ID data to contact server 115 within a defined time period.

Server 105 may further include verification component 112, which may be stored on memory component 102 and operative on processor component 104 to perform verification operations. Verification operations may include receiving a confirmation from the client device, requesting verification from a server, and upon receiving verification from the server, verifying the client device based upon the mapped session data and ID data. In an embodiment, a client device 125, after receiving ID data, may contact server 115 during a sign up process and, after contacting server 115, the client device 125 may confirm to verification component 112 of server 105 that contact with server 115 has been made. Upon receiving such confirmation, verification component 112 may contact verification component 122 of server 115 via network interface 128 and request, based upon mapped session data and ID data associated with the client device 125, confirmation that ID data was used by a client device to contact server 115.

While some examples described herein describe verification of a client device during the sign up process of an online service, the verification techniques described may be used in many other situations in which streamlined verification may be desired. For example, for security reasons, users may be logged out of online accounts due to suspicious activity or periodically. Rather than requiring users to re-enter a username and password, the verification techniques described herein may provide a faster and more convenient alternative for verifying a user. In addition, two-factor authentication may take advantage of the described verification techniques. For example, most two-factor authentication processes currently require a username and password in a first stage, which triggers a notification using SMS messaging, or other messaging, with a PIN code that must be entered in a second stage to gain access to an account. It may not be desirable to use SMS messaging in some regions due to the communication charges involved, thus, the verification techniques described herein, which may avoid incurring communications charges, may be used. Further, the verification techniques described herein avoid the tedious step of entering a code from an SMS message in the second stage. Instead, after a username and password have been entered, a user may simply press a "Free Call" user interface element to verify, for free, that the user is in possession of a verified client device.

In some embodiments, the techniques described herein may be used to verify users within advertising campaigns. In an example, users may be served advertisements within applications, websites, media content, or while otherwise using a device. Verification techniques described herein may be used when a user selects an advertisement, which may trigger the sending of a communication to a server. The communication may be disconnected by the server prior to the communication incurring a communication charge, such as a voice call, data, or messaging charge from a mobile carrier. For example, a telephone call may not incur a charge unless the connection has been established for a certain period of time, or unless a connection has successfully been made. Thus, a contacted server may determine that a connection attempt has been made without completing the connection, which may avoid fees being incurred. The contacted server may store various information about the advertisement selection, such as ID data for a user. In response to selecting the advertisement, which may offer a reward for such a selection, the server may deliver content to a user, such as media (audio, video, etc.), sports scores, stock information, messages from celebrities, ringtones, brand messages from an advertiser, game tokens, or other content deemed valuable to the user. In an example, the content delivered to the user may be sent in a manner that does not incur a fee for the user, or if a fee is required, the fee may be subsidized, in whole or in part, by an advertiser.

As previously discussed, it may be desirable to reuse ID data, such as when a finite number of telephone numbers are available for a region. Thus, a client device 125 may be required to use received ID data to contact server 115 within a defined time period after ID data was provided to the client device 125. When server 115 is contacted using ID data, such as a DID telephone number, for example, within a defined time period, verification component 122 of server 115 may verify to verification component 112 of server 105 that a client device 125 has made such contact. In various embodiments, other verification techniques may be made to provide further security. For example, verification from a server may be received after an originating telephone number associated with the client device is received in a communication and further matched with a carrier associated with the communication between the client device and the server. In this manner, spoofing, or faking, communications may be prevented and unwanted fraud may be avoided by an online service.

In various embodiments, system 100 may include server 115, which may include memory component 114 and processor component 116, which each may comprise one more of the memory component and processor components described herein. Server 115 may include database component 118, which may be utilized to store ID data that may be assigned to one or more client devices 125 upon request from server 105, as discussed above. For example, database component 118 may store a series of DID telephone numbers, or other forms of ID data, that may be used to verify client devices 125 during the sign up process for an application or service.

In some embodiments, server 115 may include generation component 120, which may be stored on memory component 114 and operative on processor component 116 to perform generation operations. Upon receipt of a request for ID data from ID component 118, generation component may retrieve ID data from database component 118. Since some ID data, such as DID telephone numbers, may be finite reusing ID data may be desirable. To achieve reusability of DID telephone numbers, for example, a DID telephone number may be marked by generation component 120 as used in database component 118, and set to expire after a defined time period, which may be associated with a used DID telephone number in database component 118. Thus, ID data may be marked as available and reused with a new client device after expiration of the defined time period.

In various embodiments, server 115 may include verification component 122, which may be stored on memory component 114 and operative on processor component 116 to perform verification operations. Verification operations may include receiving a request from another verification component, such as verification component 112, to confirm that certain ID data was utilized to communicate with server 115. In response to such a request, verification component 122 may communicate a verification message indicating that a certain ID data was utilized to communicate with server 115. Further, verification component 112 may be configured to provide verification when certain ID data is used within a defined time period, such as 60 seconds after ID data has been provided by generation component 120. In some embodiments, information about network connectivity, whether cellular or data, may be used to dynamically adjust the defined time period for a client device to utilize ID data. For example, when it is determined that voice or data connectivity is slow or intermittent, a defined time period may be increased to give the client device ample opportunity to utilize ID data. When voice or data connectivity is determined to be working properly, a defined time period may be decreased, which may provide the opportunity to reuse ID data more quickly.

In some embodiments, verification component 122 may be configured to avoid incurring communication costs for client devices 125. Connectivity charges, such as voice call, data, or messaging charges, may be important to users of client devices. For example, connectivity charges in developing countries may be significant to users and may deter users from providing information necessary to perform verification. Accordingly, in some embodiments, verification component 122 may be configured to disconnect a communication from a client device using ID data prior to the communication incurring a communication charge, such as a voice call, data, or messaging charge from a mobile carrier. For example, a telephone call may not incur a charge unless the connection has been established for a certain period of time, or unless a connection has successfully been made. Thus, when server 115 is contacted using ID data, verification component 122 may determine that a connection attempt has been made without completing the connection, which may avoid fees being incurred. In an example, when receiving a phone call, the phone call and calling number may be recorded and the call may be declined, which in some wireless carrier schemes may avoid incurring a communication charge.

Figure 2:
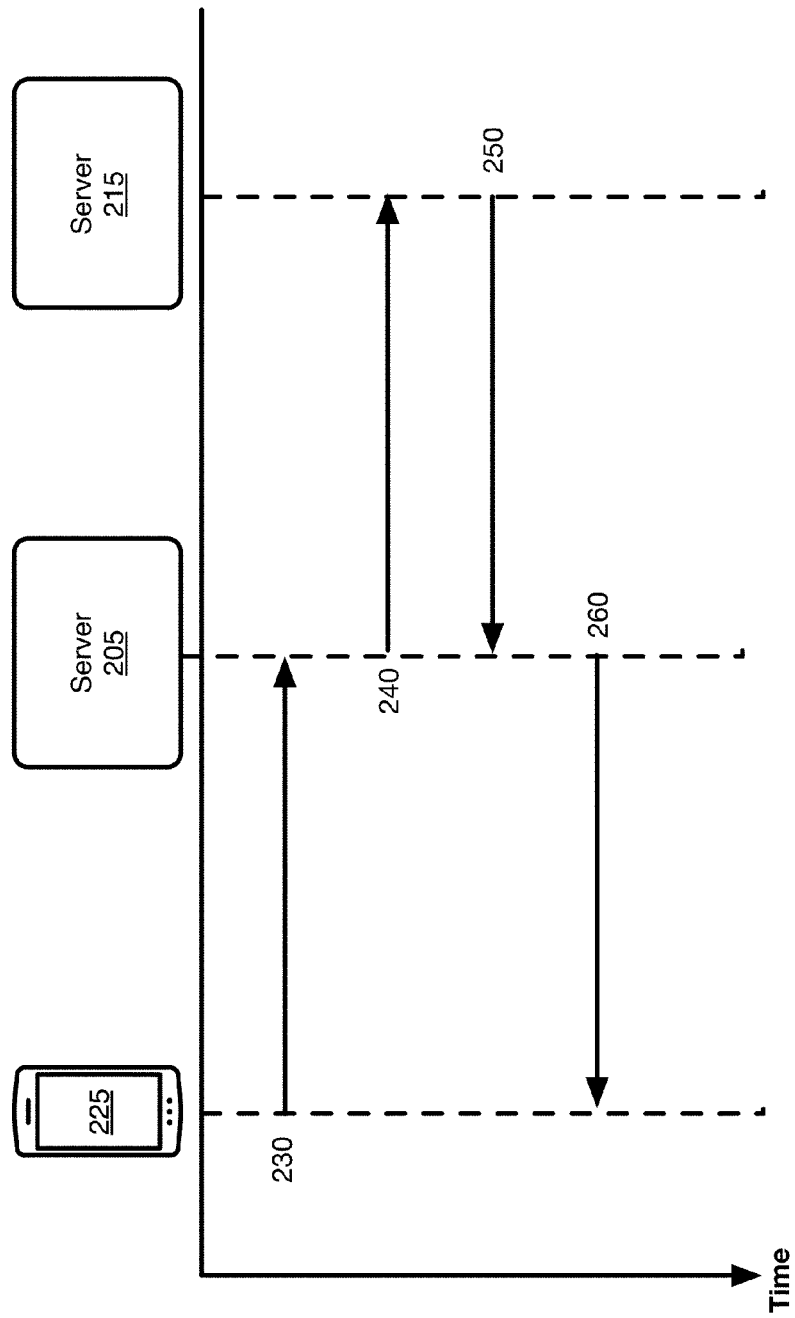
FIG. 2 illustrates a message flow according to an embodiment.

FIG. 2 illustrates a message flow 200 for call-based verification according to an embodiment. Message flow 200 illustrates pre-verification messages communicated between elements similar to those from system 100, as described above. For example, client device 225, server 205, and server 215 may correspond with client devices 125, server 105, and server 115, respectively.

Message 230 may include session data from a client device 225. As described above, session data may be received by a server 205 from a client device 225 and stored in a memory component. Received session data may be stored in association with a user or client device 225 in a database, for example. Session data may include, but is not limited to, data from server or client side web sessions implemented using one or more known communication session protocols. In some examples, a session cookie, such as an HTTP cookie, web cookie, or browser cookie may be stored on a client device and may be used to store session data, such as a session ID, user preferences, timing information, or security information.

Upon receipt of session data at message 230, server 205 may send message 240 to server 215 requesting ID data. As previously described, in some embodiments, server 205 may include an ID component, which may use an API to request ID data from server 215. In an example, an ID component of server 205 may be configured to request ID data from server 215 via a network interface, as described herein.

In response to message 240, server 215 may send message 250 containing a request ID data, such as a DID telephone number. A generation component of server 215 may generate ID data from database component, as discussed above, and return ID data to server 205 using message 250. Upon receipt of message 250, server 205 may map the received ID data with client device 225 using a mapping component.

In some embodiments, message 260 including ID data may be sent from server 205 to client device 225. As previously described, ID data may include a DID telephone number, and may be used by client device 225 to perform one or more verification functions with server 215.

Figure 3:
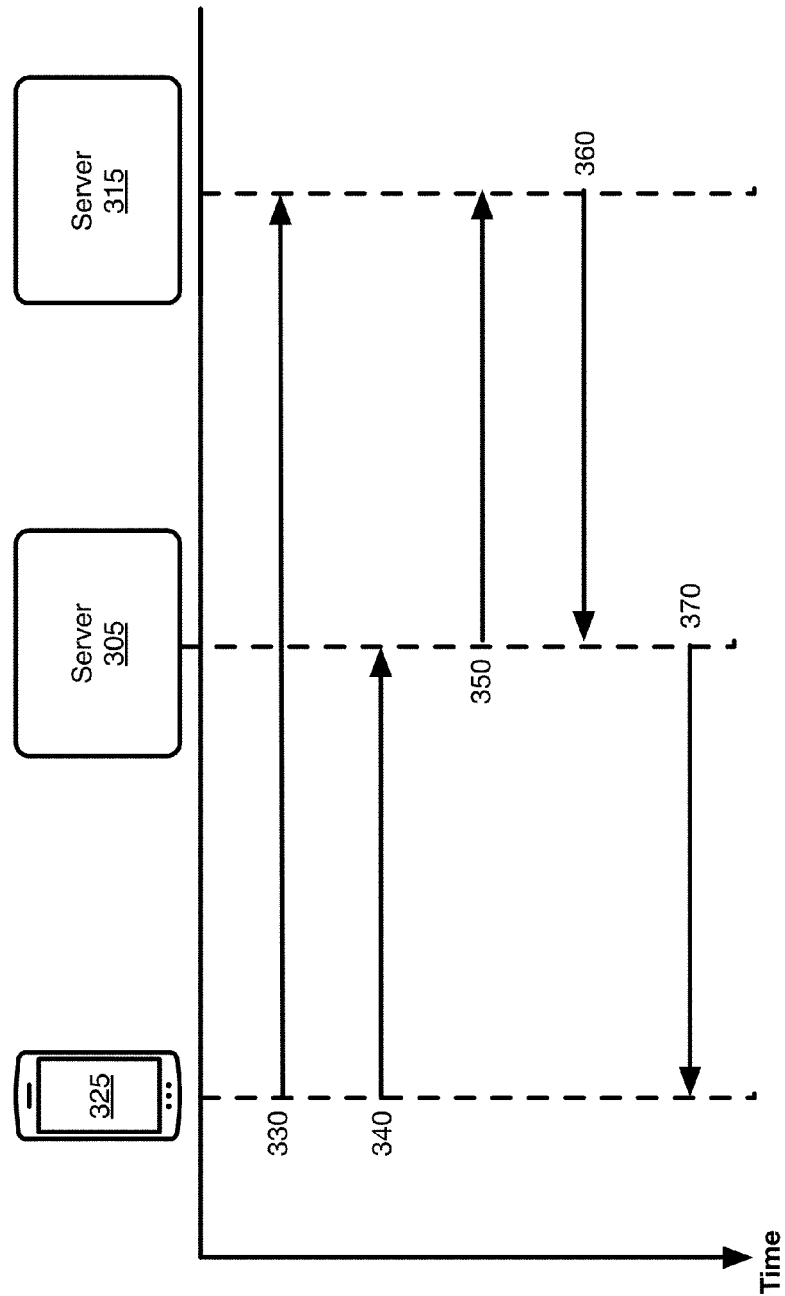
FIG. 3 illustrates a message flow according to an embodiment.

FIG. 3 illustrates a message flow 300 for call-based verification according to an embodiment. Message flow 300 illustrates verification messages communicated between elements similar to those from system 100, as described above. For example, client device 325, server 305, and server 315 may correspond with client devices 125, server 105, and server 115, respectively.

In an embodiment, message 330 may be sent from client device 325 to server 315. Message 330 may utilize ID data that was previously received at client device 325 from server 305. In one example, message 330 may use a DID telephone number to establish a communication with server 315. Upon receiving message 330, a verification component of server 315 may record that a certain ID data, such as a DID telephone number, was used within a defined period of time. Further, the verification component of server 315 may be configured to disconnect the communication from client device 325 prior to the communication incurring a communication charge, such as a voice call, data, or messaging charge from a mobile carrier. For example, a telephone call may not incur a charge unless the connection has been established for a certain period of time, or unless a connection has successfully been made. Thus, when server 315 is contacted using ID data, a verification component may determine that a connection attempt has been made without completing the connection, which may avoid fees being incurred.

Once message 330 has completed, client device 325 may send a confirmation message 340 to server 305, indicating that ID data was used in message 330 to contact server 315. In one embodiment, a user of client device 325 may be presented with a confirmation user interface element that may initiate message 340 when pressed. In other embodiments, upon detection of the end of message 330, which may be a telephone call, client device 325 may automatically send message 340 to server 305 confirming that a communication to server 315 was made and has ended.

A verification component of server 305 may send message 350 to a verification component of server 315 to verify whether a certain ID data associated with client device 325 has been used within a defined period of time. For example, when message 330 was sent within a defined period of time, such as 60 seconds, server 315 may send message 360 in response to message 350, indicating that ID data was used within the defined time period. Server 305 may use mapped data, as described above, to determine that client device 325, which may be associated with certain ID data, is verified. If so, a confirmation message 370 may be sent from server 305 to client device 325, indicating that client device 325 has been verified and a sign up process is complete, or may proceed.

Figure 4:
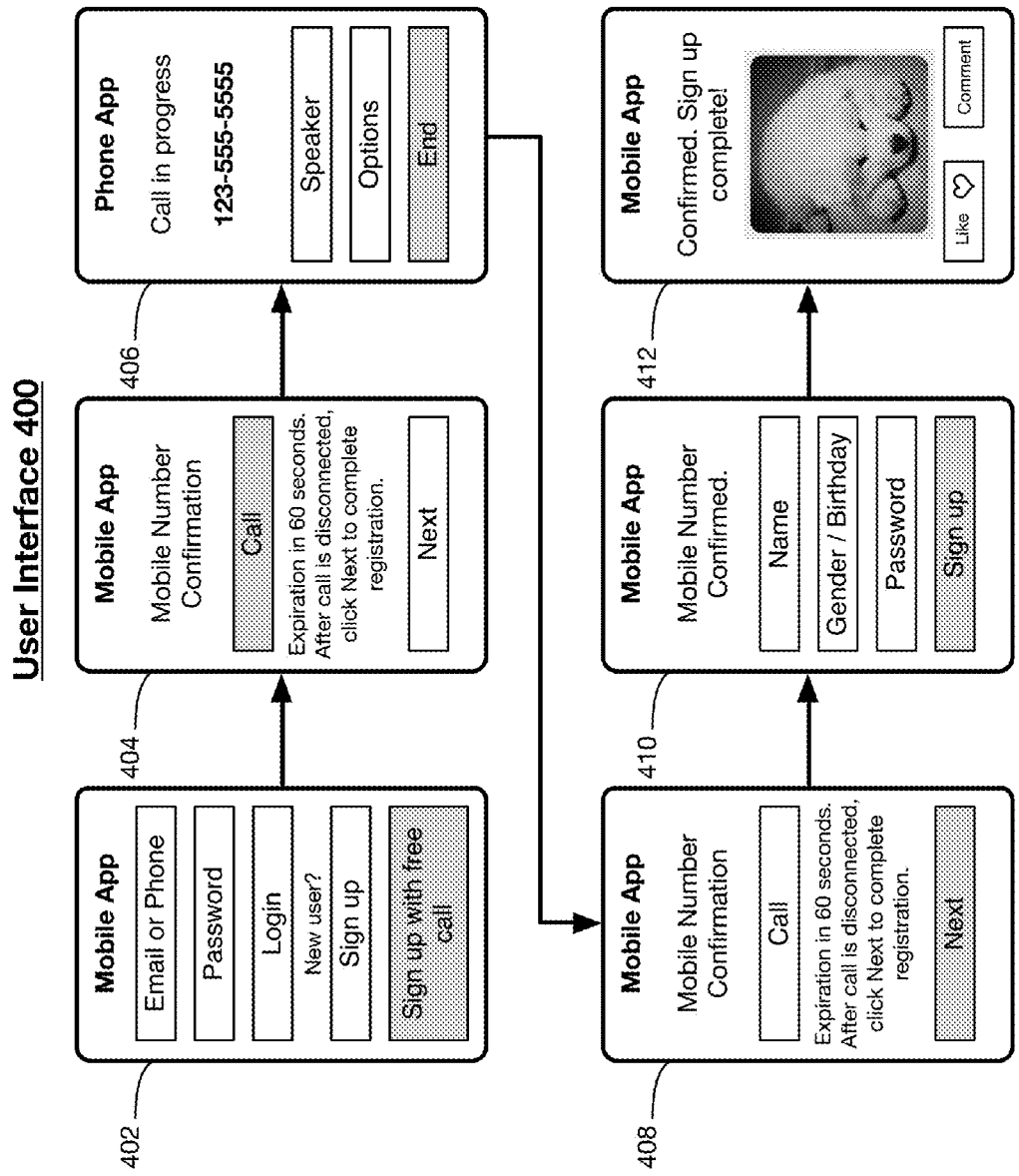
FIG. 4 illustrates a user interface according to an embodiment.

FIG. 4 illustrates one embodiment of a user interface 400. User interface 400 may be representative of a mobile application user interface configured to perform operations executed by one or more embodiments described herein. For instance, the user interface 400 may be representative of some or all of the operations executed by system 100. User interface 400 may represent one or more screens of an application, whether native or web, on a client device, such as a mobile phone or tablet device. While certain user interface elements may be shown, it can be appreciated that the techniques described herein may be accomplished using more or less user interface elements in various arrangements.

At screen 402, an application may present a user with options to log-in using email or phone information and a password. In addition, for new users, or users wishing to create a new account, an option may be presented to sign up. In addition to a traditional sign up process, a "Sign up with free call" option may be presented, which is illustrated as a shaded user interface element in screen 402. The shaded "Sign up with free call" option may initiate one or more of the call-based verification techniques described herein.

At screen 404, a user may be presented with a "Call" option to verify the mobile number of a client device during the sign up process. In an embodiment, the shaded "Call" user interface element may initiate a phone call using the mobile application, or may open another application that is configured to make phone calls. Further, the shaded "Call" user interface element may be associated with ID data received at a client device after the "Sign up with free call" user interface element was selected. Also illustrated within screen 404 is a defined time period of 60 seconds, however, a longer or shorter time period may be used. The defined time period may inform the user that a call must be placed by selecting the shaded "Call" user interface element within the displayed time period to complete verification.

Upon selection of the shaded "Call" user interface element, a phone application may be launched, as illustrated in screen 406. A call may be made using the phone application using ID data associated with the shaded "Call" user interface element from screen 404. As illustrated within screen 406, a call is in progress to a phone number, which may be a DID phone number received by a client device, as described herein.

As set forth above, a phone call may be disconnected prior to a client device incurring a communication charge. Upon disconnection of a call by a remote server, a user may be returned to screen 408 and may be prompted to choose the shaded "Next" button to confirm that the call has been completed. As described above, selection of the shaded "Next" button may confirm to a remote server that a call has been made, and further verification procedures may be performed.

At screen 410, upon successful completion of one or more verification techniques described herein, a user interface may be presented informing a user that a mobile number associated with a client device has been confirmed. A user may be presented with prompts to enter further information to establish an account with an application or service. While certain information, such as name, gender, and a password, are illustrated in screen 410, it can be appreciated that other information may be requested. Once the requested information has been entered, the shaded "Sign up" button may be selected, which leads to a confirmation screen 412 welcoming the verified user to the application or service.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 5:
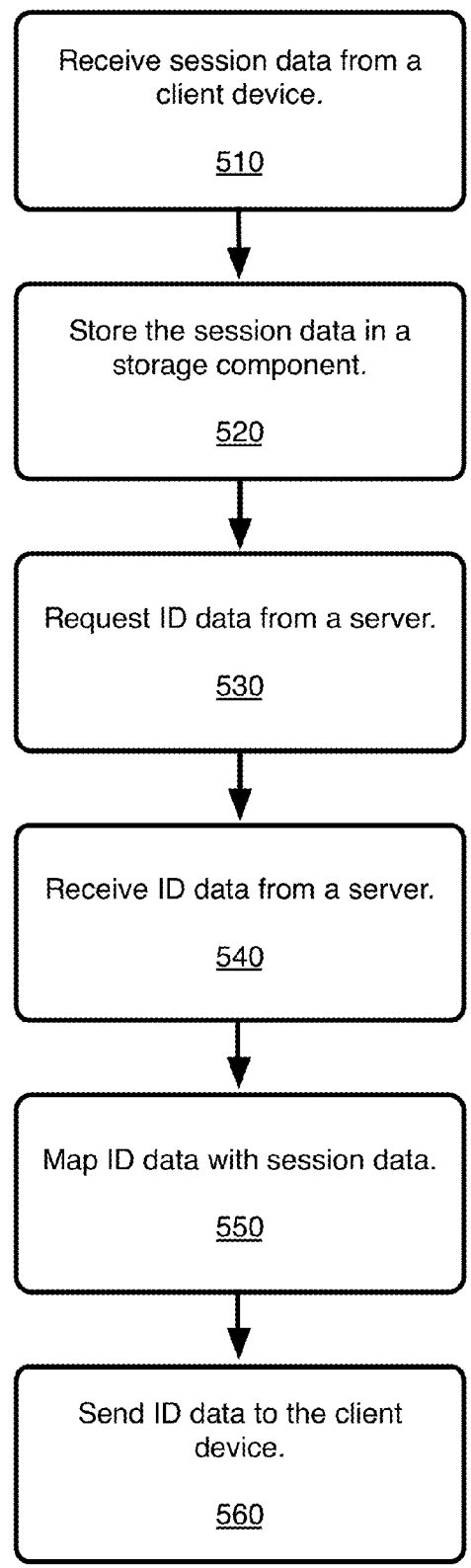
FIG. 5 illustrates a logic flow according to an embodiment.

FIG. 5 illustrates one embodiment of a logic flow 500. The logic flow 500 may be representative of some or all of the operations executed by one or more embodiments described herein. For instance, the logic flow 500 may be representative of some or all of the operations executed by system 100.

At 510, a first server may receive session data from a client device. As described above, session data may be received by the first server from a client device and stored in a memory component. Received session data may be stored at 520 in association with a user or client device in a database, for example. Session data may include, but is not limited to, data from server or client side web sessions implemented using one or more known communication session protocols. In some examples, a session cookie, such as an HTTP cookie, web cookie, or browser cookie may be stored on a client device and may be used to store session data, such as a session ID, user preferences, timing information, or security information.

At 530, upon receipt of session data, the first server may request ID data from a second server. In some embodiments, an API may be used for such a request. In response, the second server may send ID data, such as a DID telephone number, and the ID data may be received by the first server at 540. Of course, other ID data may be used, as described herein.

At 550, a mapping component of the first server may perform mapping operations including the association of ID data with session data, which may be associated in a database or other data structure stored in a memory component. In this manner, verification, as discussed herein, may be made as to whether a particular client device has utilized ID data to contact the second server during a particular verification session.

At 560, ID data may be sent to a client device such that the ID data may be used for one or more of the verification techniques described herein.

Figure 6:
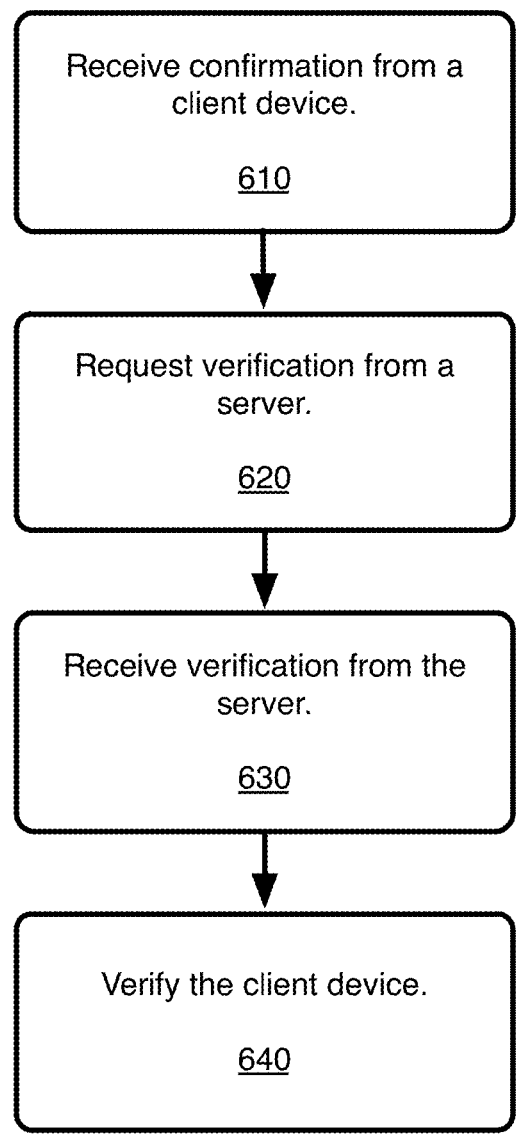
FIG. 6 illustrates a logic flow according to an embodiment.

FIG. 6 illustrates one embodiment of a logic flow 600. The logic flow 600 may be representative of some or all of the operations executed by one or more embodiments described herein. For instance, the logic flow 600 may be representative of some or all of the operations executed by system 100, for example.

At 610, a confirmation may be received at a first server from a client device. In an example, a client device may have called a second server using a DID telephone number, as described above. Once the call has been disconnected by the second server, a user of a client device, or the client device automatically, may initiate a confirmation message to the first server indicating that the call has been completed. Again, it can be appreciated that other types of ID data may be used, including, but not limited to unique identifiers, IP addresses, or other information that may be used to identify a client device.

At 620, the first server, upon receiving confirmation from a client device, may request verification from the second server. For example, a verification component of the first server may send a request to a verification component of the second server to verify whether a certain ID data associated with a client device has been used within a defined period of time. If certain ID data has been used within the defined period of time, the second server may provide verification to the first server at 630.

At 640, the first server, upon receiving verification that certain ID data was used within the defined period of time, may use mapped data, as described above, to determine that a client device, which may be associated with the certain ID data, is verified. If so, a confirmation message may be sent from the first server to a client device indicating that the client device has been verified and a sign up process is complete, or may proceed.

Figure 7:
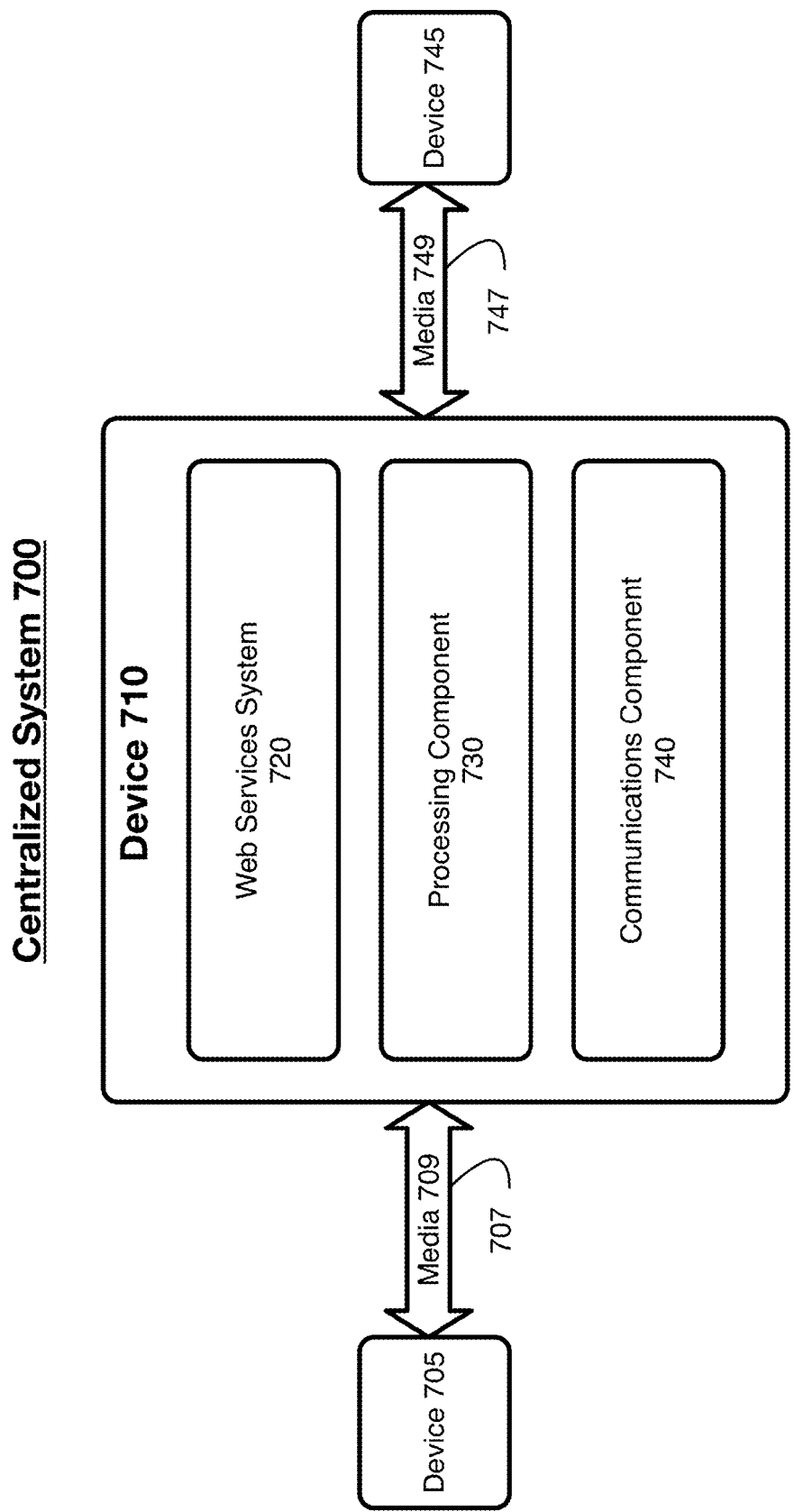
FIG. 7 illustrates an embodiment of a centralized system according to an embodiment.

FIG. 7 illustrates a block diagram of a centralized system 700. The centralized system 700 may implement some or all of the structure and/or operations for the web services system 720 in a single computing entity, such as entirely within a single device 710.

The device 710 may comprise any electronic device capable of receiving, processing, and sending information for the web services system 720. Examples of an electronic device may include without limitation a client device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, multiprocessor systems, processor-based systems, consumer electronics, programmable consumer electronics, game devices, television, set top box, wireless access point, base station, subscriber station, mobile subscriber center, radio network controller, router, hub, gateway, bridge, switch, machine, or combination thereof. The embodiments are not limited in this context.

The device 710 may execute processing operations or logic for the web services system 720 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 710 may execute communications operations or logic for the web services system 720 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 709, 749 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 710 may communicate with other devices 705, 745 over a communications media 709, 749, respectively, using communications signals 707, 747, respectively, via the communications component 740. The devices 705, 745, may be internal or external to the device 710 as desired for a given implementation.

For example, device 705 may correspond to a client device such as a phone used by a user. Signals 707 sent over media 709 may therefore comprise communication between the phone and the web services system 720 in which the phone transmits a request and receives a web page in response.

Device 745 may correspond to a second user device used by a different user from the first user, described above. In one embodiment, device 745 may submit information to the web services system 720 using signals 747 sent over media 749 to construct an invitation to the first user to join the services offered by web services system 720. For example, if web services system 720 comprises a social networking service, the information sent as signals 747 may include a name and contact information for the first user, the contact information including phone number or other information used later by the web services system 720 to recognize an incoming request from the user. In other embodiments, device 745 may correspond to a device used by a different user that is a friend of the first user on a social networking service, the signals 747 including status information, news, images, or other social-networking information that is eventually transmitted to device 705 for viewing by the first user as part of the social networking functionality of the web services system 720.

Figure 8:
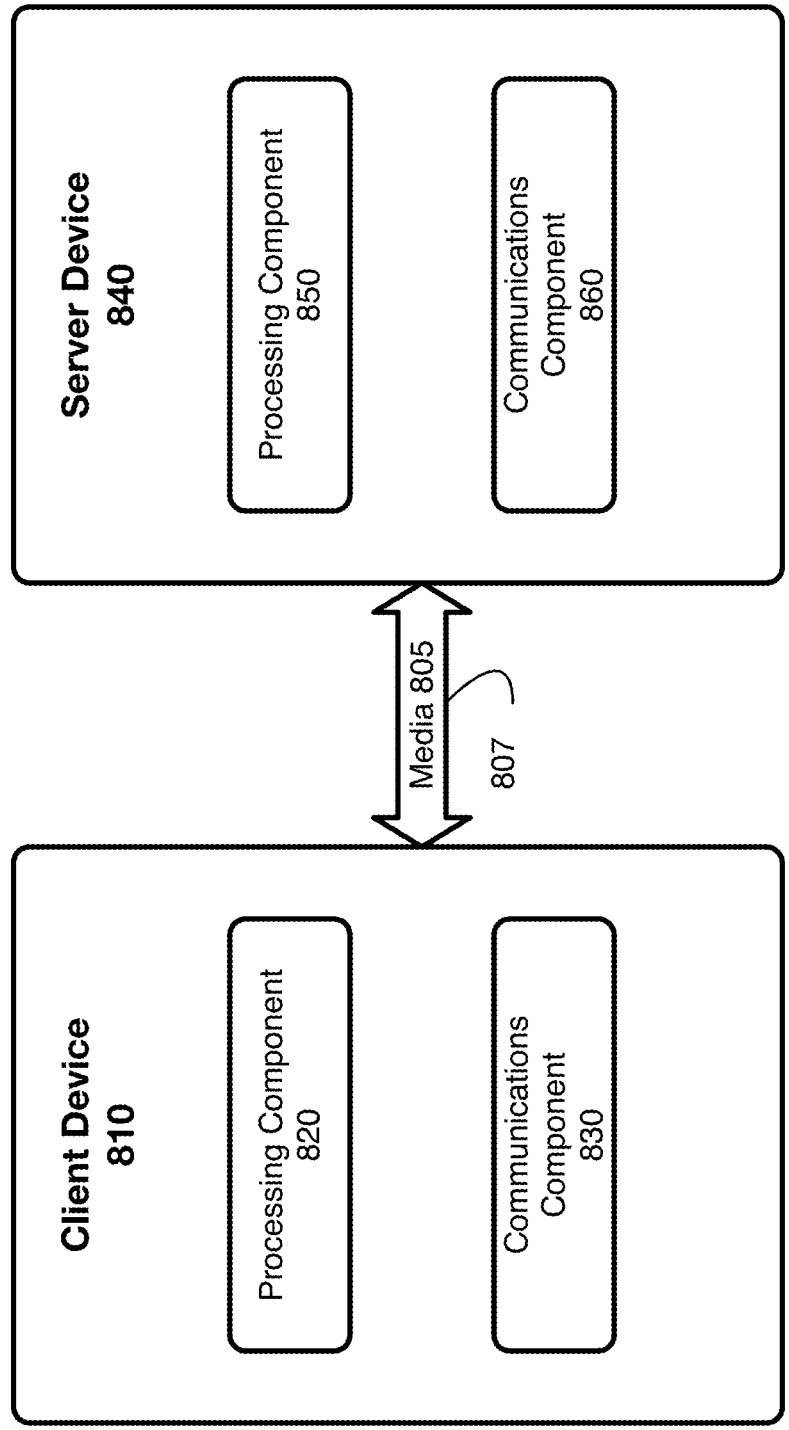
FIG. 8 illustrates an embodiment of a distributed system according to an embodiment.

FIG. 8 illustrates a block diagram of a distributed system 800. The distributed system 800 may distribute portions of the structure and/or operations for the disclosed embodiments across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a client device 810 and a server device 840. In general, the client device 810 and the server device 840 may be the same or similar to device 710 as described with reference to FIG. 7. For instance, the client device 810 and the server device 840 may each comprise a processing component 820, 850 and a communications component 830, 860 which are the same or similar to the processing component 730 and the communications component 740, respectively, as described with reference to FIG. 7. In another example, the devices 810 and 840 may communicate over a communications media 805 using media 805 via signals 807.

The client device 810 may comprise or employ one or more client programs that operate to perform various methodologies in accordance with the described embodiments. In one embodiment, for example, the client device 810 may implement some steps described with respect client devices described in the preceding figures.

Figure 9:
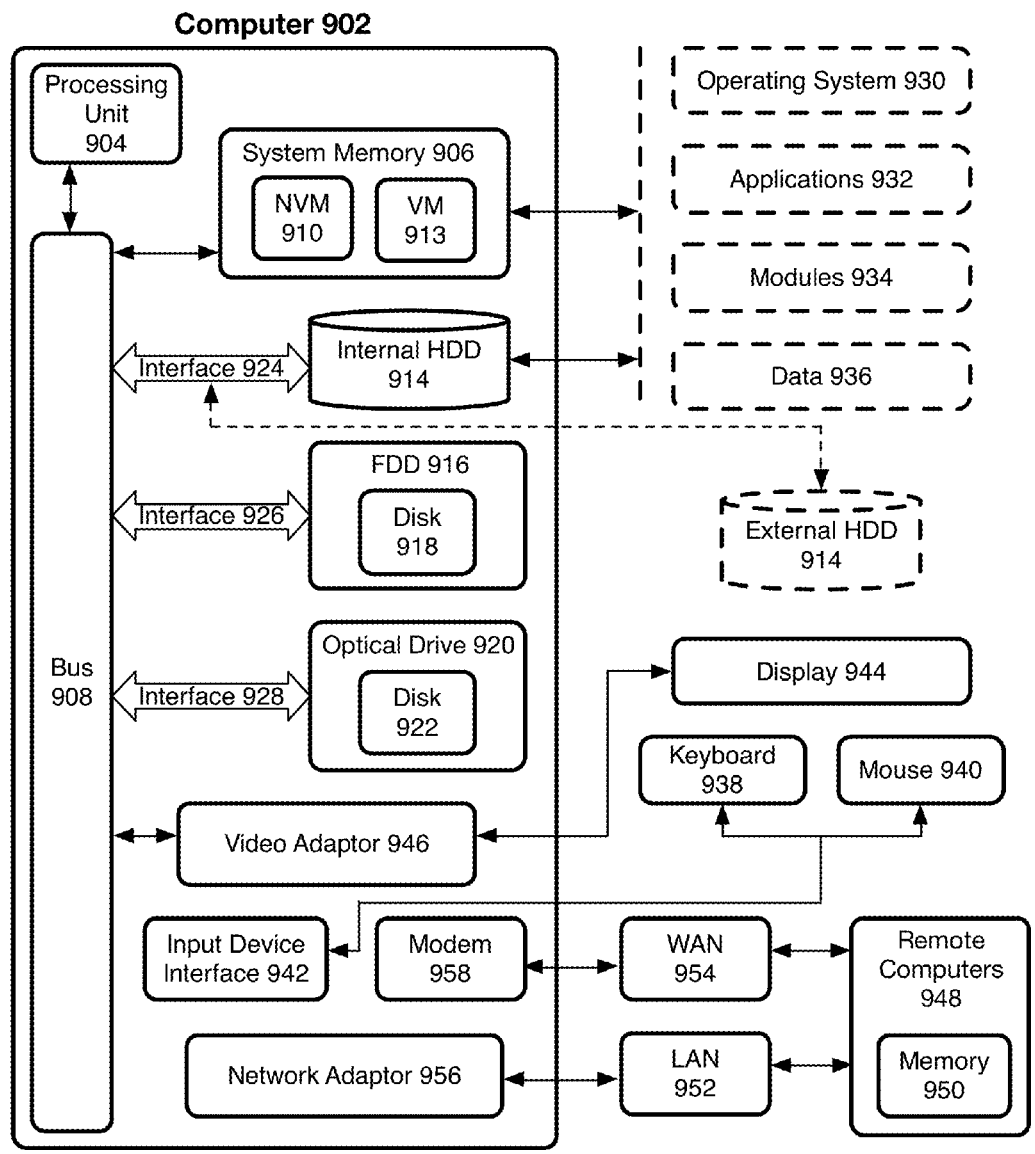
FIG. 9 illustrates an embodiment of a computing architecture.

The server device 840 may comprise or employ one or more server programs that operate to perform various methodologies in accordance with the described embodiments. In one embodiment, for example, the server device 840 may implement some steps described with respect to server devices described in the preceding figures FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 913. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM, DVD, or Blu-ray). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 913, including an operating system 930, one or more application programs 932, other program modules 934, and program data 936. In one embodiment, the one or more application programs 932, other program modules 934, and program data 936 can include, for example, the various applications and/or components to implement the disclosed embodiments.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A display 944 is also connected to the system bus 908 via an interface, such as a video adaptor 946. The display 944 may be internal or external to the computer 902. In addition to the display 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
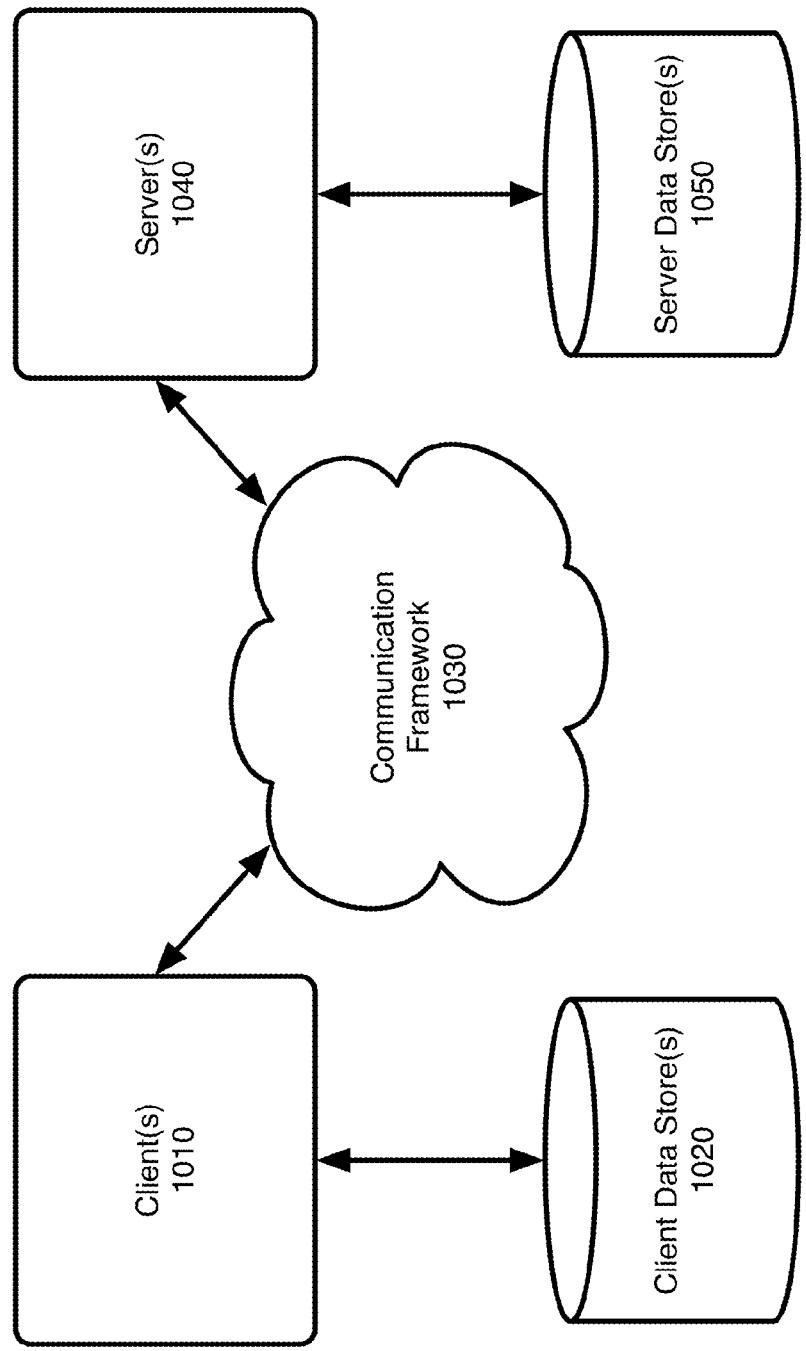
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1010 and servers 1040. The clients 1010 may implement the client device 1010, for example. The servers 1040 may implement the server device 1040, for example. The clients 1010 and the servers 1040 are operatively connected to one or more respective client data stores 1020 and server data stores 1050 that can be employed to store information local to the respective clients 1010 and servers 1040, such as cookies and/or associated contextual information.

The clients 1010 and the servers 1040 may communicate information between each other using a communication framework 1030. The communications framework 1030 may implement any well-known communications techniques and protocols. The communications framework 1030 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1030 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1010 and the servers 1040. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
   a processor circuit;
   a storage component communicatively coupled to the processor circuit, the storage component to store a generation component and a verification component;
   the generation component operative on the processor circuit to receive, at the apparatus, a first request for identification (ID) data from a remote server, retrieve the ID data in response to the first request, and return the ID data to the remote server, the ID data for use by a client device with the verification component; and
   the verification component operative on the processor circuit to receive a communication from a client device with the ID data, receive a second request from the remote server to confirm the communication of the client device, and communicate a verification message to the remote server in response to the second request, the verification message indicating that the ID data was used by the client device.

2. The apparatus of claim 1, the generation component to generate the ID data and store the ID data in a database component.

3. The apparatus of claim 1, the generation component to retrieve the ID data from a database component, mark the retrieved ID data as used in the database component, and to set an expiration period for the retrieved ID data.

4. The apparatus of claim 1, wherein the ID data is a direct inward dial (DID) telephone number.

5. The apparatus of claim 1, wherein the second request comprises the ID data.

6. The apparatus of claim 1, wherein the verification message indicates that the ID data used to communicate with the apparatus was used within a defined time period.

7. The apparatus of claim 1, the verification component to disconnect the communication from the client device prior to the communication from the client device incurring a communication charge.

8. A computer-implemented method, comprising:
   receiving, at a first server, a first request for identification (ID) data from a second server;
   generating, at the first server, the ID data, the ID data for use by a client device to communicate with the first server;
   returning the ID data to the second server;
   receiving, at the first server, a communication from a client device with the ID data;
   receiving, at the first server, a second request from the second server to confirm the communication of the client device; and
   communicating, in response to the second request, a verification message to the second server, the verification message indicating that the ID data was used by the client device to communicate with the first server.

9. The computer-implemented method of claim 8, comprising:
   recording that the ID data was used within a defined period of time, when the communication from the client device is received.

10. The computer-implemented method of claim 9, wherein the verification message comprises an indication that the ID data was used within the defined period of time.

11. The computer-implemented method of claim 8, wherein the ID data is a direct inward dial (DID) telephone number.

12. The computer-implemented method of claim 8, wherein the second request comprises the ID data.

13. The computer-implemented method of claim 8, comprising disconnecting the communication from the client device prior to the communication from the client device incurring a communication charge.

14. An article comprising a non-transitory computer-readable storage medium including instructions that, when executed by a processor circuit, cause a system to:
   receive a first request for identification (ID) data, from a server;
   retrieve the ID data from a database component, wherein the ID data comprises data for use to verify a client device;
   return the ID data to the server;
   receive a communication from a client device with the ID data;
   receive a second request from the server to confirm the communication of the client device; and
   communicate a verification message to the server, in response to the second request, the verification message indicating that the ID data was used by the client device.

15. The article of claim 14, further comprising instructions that when executed by the processor circuit, cause system to mark the retrieved ID data as used in the database component and to set an expiration period for the retrieved ID data.

16. The article of claim 14, wherein the ID data is a direct inward dial (DID) telephone number.

17. The article of claim 14, wherein the second request comprises the ID data.

18. The article of claim 14, further comprising instructions that when executed by the processor circuit, cause the system to record that the ID data was used within a defined period of time, when the communication from the client device is received.

19. The article of claim 18, wherein the verification message indicates that the ID data used by the client was used within a defined time period.

20. The article of claim 14, further comprising instructions that when executed by the processor circuit, cause the system to disconnect the communication from the client device prior to the communication from the client device incurring a communication charge.

* * * * *